United States Patent Office 2,886,300
Patented May 12, 1959

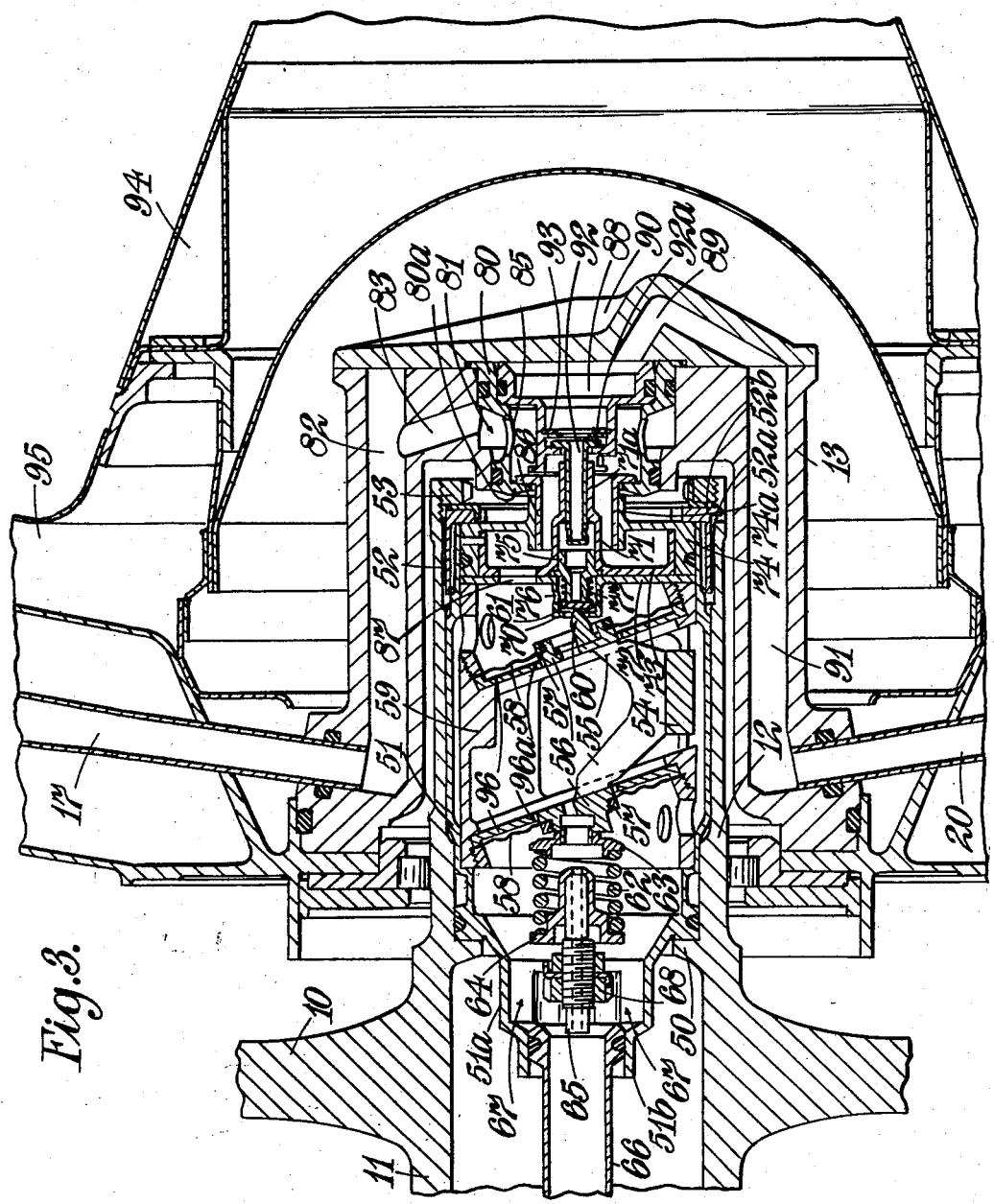

2,886,300

ROTATIONAL SPEED SENSITIVE DEVICE

Lionel Haworth, Littleover, Donald McLean, Derby, Kenneth Arnold Basford, Alvaston, and Edward Page, Chellaston, England, assignors to Rolls Royce Limited, Derby, England, a British company Application May 20, 1957, Serial No. 660,264

Claims priority, application Great Britain May 25, 1956

11 Claims. (Cl. 264—20)

This invention comprises improvements in or relating to rotational-speed-sensitive devices of the kind in which a response is produced by centrifugal action.

According to the present invention, a rotational-speed-sensitive device comprises a pair of flexible diaphragms clamped at their peripheries in a mounting by which they may be secured in the rotating part to the speed of which the device is to be sensitive, the diaphragms having their centres on the axis of rotation, being spaced axially apart and having their planes parallel to one another and inclined to the axis of rotation, a mass disposed between the diaphragms, offset from the axis of rotation and connected to transmit centrifugal loads to the centres of the diaphragms, and means joining the centres rigidly together, whereby on rotation of the device the centres of the diaphragms are displaced axially owing to the centrifugal effect on the mass, and resilient means to oppose the axial displacement of the diaphragms centres.

The radial centrifugal force produced by the mass on rotation can be resolved into components parallel to and at right angles to the diaphragms, of which the component parallel to the diaphragms is resisted thereby and of which the component at right angles to the diaphragms can be resolved into axial and radial components, of which the axial component may be used to operate a device to indicate the speed or to effect a controlling action. Also it will be clear that the axial movement can be obtained without the need for sliding contact of parts of the device.

Preferably, the mass is connected to the diaphragm centres by a pair of integral rigid diverging arms so that the means rigidly connecting the diaphragm centres is afforded by the mass and its arms.

Preferably, moreover, the resilient means is in the form of a coil compression spring arranged coaxial with the axis of rotation.

The inclination of the planes of the diaphragms to the axis of rotation may be of any convenient value but an angle of 70° is found to be suitable.

The device of the invention is especially suitable for speed governor devices, and in such a use the axial movement of the mass and diaphragm assembly can be employed to give a speed signal by arranging that the assembly actuates a fluid pressure control valve in, say, an hydraulic servo system.

There will now be described one top-speed governor arrangement of this invention suitable for use in connection with gas-turbine jet-propulsion engines, the description making reference to the accompanying drawings, in which:

Figure 3 illustrates one form of speed-responsive means for use in the arrangement of Figure 1.

Figure 1:
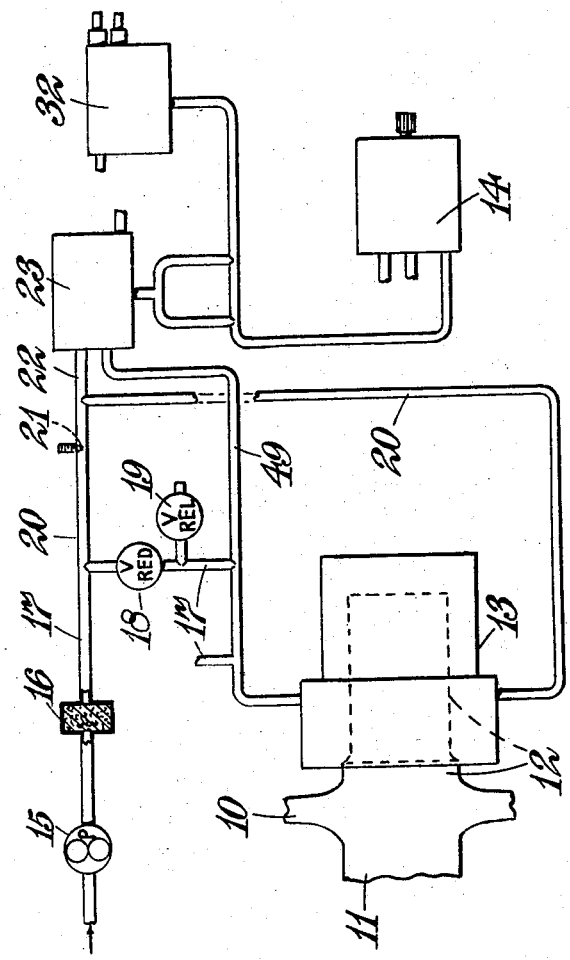
Figure 1 is a diagram illustrating the arrangement.

Referring first to Figure 1, there is illustrated a turbine rotor disc 10 of a gas turbine engine, which is connected by a drive shaft 11 to the load, and the shaft 11 is shown as having a tail portion 12 on the side of the turbine rotor disc 10 remote from the load. The tail portion 12 of the shaft takes no driving loads and so is unlikely to fail in operation of the engine.

The top-speed governor system associated with the turbine rotor disc 10 comprises a speed-responsive device accommodated within the tail portion 12 of the shaft which is within stator structure 13. Thus, even though the drive shaft 11 fails, the speed-responsive device will still operate to limit the rotational speed of the turbine. The speed-responsive device is arranged to control the delivery of fuel to the combustion equipment of the engine by a fuel pump 14 through a servo-mechanism so as to cut down the fuel supply to the engine when the speed of the turbine rotor disc 10 tends to exceed a selected value, thereby to reduce the turbine speed.

In the arrangement illustrated, the servo-mechanism employs as one of its operating fluids lubricating oil derived from the engine lubricating system. The lubricating system comprises an oil pump 15 which delivers through a filter 16 into a pressure oil line 17 leading to the bearings of the engine, and having fitted in it a pressure-reducing valve 18 and, downstream of the reducing valve 18, a pressure relief valve 19 which controls the pressure in the line 17 downstream of the reducing valve at a value lower than the pressure upstream of the reducing valve. Some of the lubricating oil flowing in the pressure oil line 17 is taken to the bearings at the turbine end of the engine through the stationary structure 13 and to the speed-responsive device accommodated within the tail portion 12 of the shaft and oil is also fed to other bearings through suitable branches from the oil line 17.

A branch line 20 is taken from the pressure oil line 17 at a point upstream of the reducing valve 18 and the branch line 20 leads past a restrictor 21 to the stationary structure 13. The oil pressure within the portion of the branch line 20 downstream of the restrictor 21 is controlled by pressure-reducing valve 18 to be a constant amount above the pressure in line 17 downstream of the pressure-reducing valve, but, when the speed-responsive device senses a speed above the selected value the pressure in the downstream portion of the branch line 20 is caused to fall. This pressure is applied through a sub-branch line 22 in a mechanism 23 to effect a control on the engine fuel pump 14.

Figure 2:
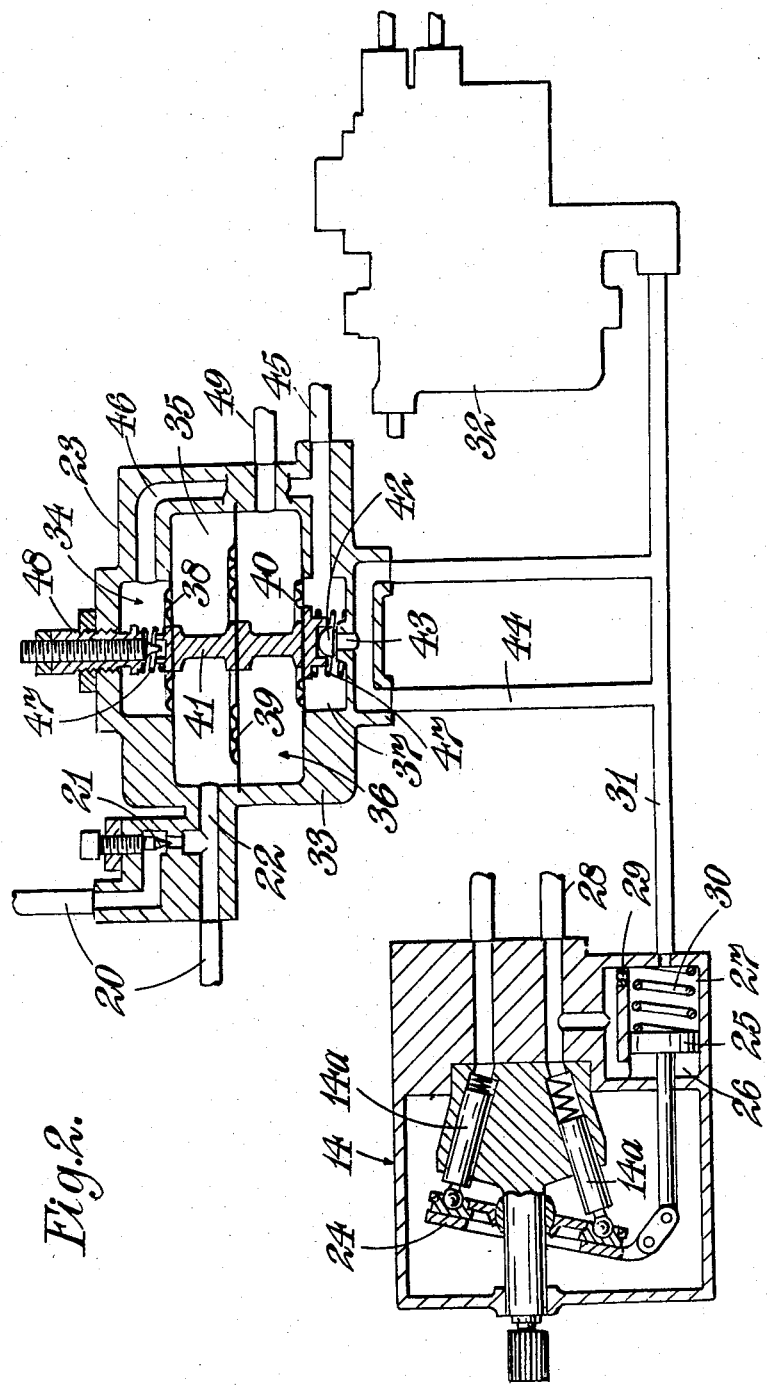
Figure 2 is a detail of part of the arrangement of Figure 1.

Referring now to Figure 2, the fuel pump 14 is illustrated as a multi-plunger-type pump whereof the stroke of the plungers 14a is controlled by a swash-plate mechanism 24. The angle of inclination of the swash-plate is varied by means of a piston 25 dividing a cylinder space into two chambers 26, 27, whereof the chamber 26 is connected directly to the delivery line 28 of the fuel pump and whereof the chamber 27 is connected to the delivery line 28 through a restrictor 29. A spring 30 is accommodated within the chamber 27 to load the piston in a sense to increase the angle of inclination of the swash plate mechanism 24 and thus the delivery of the fuel pump 14. The chamber 27 also has connected to it a bleed pipe 31, and it will be clear that, when a flow occurs in the bleed pipe 31, the pressure within the chamber 27 will be lower than the pressure within the chamber 26 and for a given bleed flow in the pipe 31 the piston 25 will take up a corresponding position in its cylinder. It will be clear also that an increase in the bleed flow in the pipe 31 will cause the piston 25 to move to the right as seen in the drawing so reducing the inclination of the swash-plate 24 and the delivery of the pump 14. Conversely, a decrease in the bleed flow through the bleed pipe 31 will cause an increase in the delivery of the fuel pump.

In normal operation of the engine, the bleed flow through the bleed pipe 31 is controlled by a mechanism indicated at 32, which mechanism may be of any known or convenient kind such as a barometric pressure control or a barometric flow control and such controls will be well-known to those skilled in the art.

The mechanism 23 referred to above is similar to the control mechanism 32 in that it effects a control on the bleed flow through the bleed pipe 31 so varying the fuel delivery of the pump 14. The mechanism 23 comprises a main body 33 divided into four chambers 34, 35, 36 and 37 by a series of three interconnected flexible diaphragms 38, 39 and 40, of which the end diaphragms 38 and 40 are of equal effective area and of which the central diaphragm 39 is of substantially greater effective area. The three diaphragms have their centres operatively connected together by a tie member 41 which carries at its lower end a half-ball valve element 42 controlling an orifice 43. The valve formed by the element 42 and orifice 43 permits, when open, a larger flow compared with the corresponding element in the mechanism 32 so as to obtain a rapid response. The orifice 43 connects the chamber 37 with the mid-point of a duct 44, the ends of which are connected to the bleed pipe 31 at spaced points therein, and the chamber 37 is connected by a pipe 45 to the suction side 28a of the fuel pump 14. The chamber 34 is connected by a duct 46 to the pipe 45 and so the pressures in the chambers 34 and 37 are equal. The diaphragm system is loaded by a pair of oppositely-acting springs 47, one spring being in each of the chambers 34 and 37 and the spring in the chamber 34 having an adjustable abutment 48. The chamber 36 is connected by a line 49 to the main pressure oil line 17 at a point downstream of the reducing valve 18.

The chamber 35 has the sub-branch line 22 opening into it and thus the upper side of the diaphragm 39 is subjected to the pressure in the branch line 20 downstream of the restrictor 21, which pressure, as has been said, is controlled by the speed-responsive device, and is normally at a constant amount above the pressure in line 49. Thus in normal operation, the diaphragm assembly 38, 39, 40 tends to keep the half-ball valve element 42 closed on the orifice 43.

It will be clear that as the pressure in the chamber 35 decreases below a given value, the pressure in the chamber 36 being sensibly constant, the half-ball valve element 42 will open so to permit a bleed flow from the chamber 27 through the bleed pipe 31, thus to reduce the fuel delivery. Conversely, when the pressure in chamber 35 increases above the given value, the half-ball valve element 42 will close the orifice 43 to cut off the bleed flow from chamber 27.

It is arranged that the speed-responsive device within the tail portion 12 of the turbine shaft controls the pressure in the downstream portion of the branch line 20 by opening a valve (61, Figure 3) when the speed of the turbine rotor exceeds a selected value, permitting a flow through the branch pipe 20 and thus a decrease in the pressure within the portion of the branch line 20 downstream of the restrictor 21. This results in lifting of the valve 42 from the orifice 43 and a decrease in the fuel delivery.

Referring now to Figure 3, there is illustrated in detail one construction of the speed-responsive device and of the valve 61 in the branch pipe 20, which is actuated directly by the speed-responsive device.

The tail portion 12 of the shaft is formed at a point remote from its free end with an internal flange 50 affording a shoulder against which abuts a casing 51 accommodating the speed-responsive device and the valve, the casing being retained in position by an internally-splined sleeve 52 and a ring nut 53 which is threaded into the end of the tail shaft 12. The splines of the sleeve 52 co-operate with splines on the exterior of the casing 51 so that the sleeve is locked angularly to the casing, and the sleeve has an outwardly-projecting lug 52a engaging in a notch in the end of the tail shaft 12 so locating the casing 51 angularly with respect to the tail shaft.

The speed-responsive device comprises a large mass 54 connected by a pair of diverging arms 55 to two boss pieces 56 each of which is clamped by a ring nut 57 to the centre of an associated flexible diaphragm 58. The peripheries of the two diaphragms 58 are clamped to a generally tubular housing member 59 so that their planes are parallel to one another and so that, when the housing member 59 is fitted in the casing 51, the planes are inclined to the axis of the tail shaft 12.

The diaphragms 58 are thus coupled together by a rigid member which incorporates a centrifugal weight (the large mass 54) and the diaphragms act to resolve the centrifugal force produced by the mass on rotation of the turbine in a manner to produce a movement of their centres having a component axially of the shaft. The centrifugal force acts radially of the shaft, and this force can be resolved parallel to and at right angles to the diaphragms 58. The component parallel to the diaphragms 58 is resisted by them, while the component at right angles to them results in movement of the diaphragm in this direction. This component of force, and the movement, may also be resolved into components axially of the shaft and radially thereof, and it is the axial component of the force and of the diaphragm movement which is used to indicate the speed or to effect a controlling action. Also the diaphragms 58 provide a frictionless support for the moving parts. Further, since the centres of the diaphragms are on the axis of the shaft 12, the centrifugal loads on them due to their own mass and of the liquid in contact with them is kept to a minimum. Again, since the mass 54 is at the largest possible radius, the mass of the whole governor can be kept to a minimum for any particular operating force and the speed setting errors due to random eccentricities caused, say, by bearing wear can be kept low.

Movements of the diaphragm assembly 54, 55, 56, 57, 58 are damped hydraulically by the provision of fixed plates 96 parallel to the diaphragms 58, the plates 96 having centrally thereof holes 96a into which the bosses 56 project with a small clearance.

The valve actuated by the speed-sensitive device comprises a disc valve element 61 and the axial component of movement of the diaphragms 98 is employed to control the position of the disc valve element. This is done by providing a projecting nib 60 on one of the boss pieces 56 to bear on the disc valve element 61. The diaphragm assembly is urged towards the disc valve element 61, so as to hold it in the closed position, by a stiff compression coil spring 62 coaxial with the shaft and having a first abutment on a collar 63 mounted on the other of the bosses 56 and a second abutment on a cap member 64 supported coaxially with the shaft on a centrally-bored spindle 65 threaded into a reduced-diameter, spider-like portion 51a of the casing 51, which portion affords a series of passages 67 extending from the space accommodating the diaphragms to a socket 51b which receives the end of an oil pipe 66 leading to bearings of the engine. The portion 51a of the casing has a central recess accommodating a lock nut 68 for the spindle 65. The arrangement of the spring 62 coaxially with the shaft avoids difficulties due to bending of the spring under centrifugal loads and also avoids whirling.

The disc valve 61 is accommodated within a valve body afforded by oppositely-extending hollow bosses 70, 71 on a pair of plates 72, 73 respectively, the peripheries of which are held against one end of the housing member 59 by means of a member 74 and an internal flange 52b on the sleeve 52.

The disc valve 61 co-operates with one end of a central bore in an orifice piece 75 which is accommodated within the hollow bosses 70, 71 and has a peripheral flange sandwiched between the adjacent portions of the two plates 72, 73 so as to be held in position. The opposite end of the bore in the orifice piece 75 opens to within the boss 71 on the plate 73 and this space is supplied with oil under pressure from the branch line 20 in a manner hereinafter to be described. A spring 77 surrounds one end of the orifice piece 75 and bears on the disc valve 61 to tend to move it clear of this end of the bore in the orifice piece, and the hollow boss 70 is formed as a cage to retain the disc valve and has a series of lateral outlets 76 to the space accommodating the diaphragms 58 and has a hole in its end through which projects the nib 60 on the first boss 56 to abut the disc valve 61.

The stationary structure 13 has a sleeve 80 fitted in its end coaxially with the tail shaft 12, the sleeve 80 co-operating with an internal boss in the structure 13 to afford a gallery 81 connected by a drilling 83 to a duct 82 which is connected with the end of the pipe 17 above referred to. Pressure oil from the pipe 17 thus flows into the gallery 81, and then it flows from the gallery, through ports 85, to within the sleeve 80. The end of the sleeve 80 adjacent the tail shaft 12 has an internal flange 80a co-operating in abutment with an outward flange on a tubular transfer member 86 through which oil is conveyed from within the sleeve 80 into the space containing the diaphragms 58, there being ports 87 in the plates 72, 73 to permit the passage of the oil past them. The external surface of the transfer member 86 is cylindrical and fits within a cylindrical boss 74a at the centre of the member 74. There is thus formed an oil seal which prevents leakage of oil from the space containing the diaphragms 58. The member 86 is free to rotate relative to both the boss 74a and the sleeve 80.

A hollow plug 88 is fitted within the sleeve 80 to be coaxial with the shaft and the bore of the plug 88 communicates through drillings 89 in an end plate 90 forming part of the stationary structure 13 with a duct 91 leading to the end of the branch oil pipe 20 so that thereby pressure oil in the branch line 20 is conveyed to the bore of the plug 88.

The bore of the plug member 88 has fitted within it a hollow transfer tube 92, the bore of which conveys oil from the plug to within the boss 71 and thus to the orifice piece 75. The transfer tube 92 has, at its end projecting within the plug 88, a flange 92a which is retained against an internal flange on the plug member by a circular spring clip 93 in a groove in the bore of the plug member 88.

The external surface of the transfer tube 92 is cylindrical and fits within a cylindrical bore in an extension 71a of the boss 71 thereby providing an oil seal preventing excessive leakage of oil from within the boss 71 to the space within the transfer member 86 which is at lower pressure. The tube 92 may rotate relative to both the boss 71 and the plug 88.

It will be clear from the above description that, when the speed of the turbine tends to exceed a selected value, the spring 62 is compressed by the axial displacement of the centres of the diaphragms 58 so carrying the nib 60 clear of the disc valve 61 which is lifted by spring 77 to uncover the bore in the orifice piece 75. A flow of oil thus occurs from pipe 20 into the stream of oil from line 17 thus lowering the pressure acting on diaphragm 39 (Figure 2) allowing valve 42 to open and cause a reduction in the fuel delivery. It is arranged that in the event of failure of the turbine drive shaft 11, the governor will act quickly to cut down the fuel delivery thus preventing bursting of the turbine disc 10.

It will also be clear that when the speed drops below the selected value the fuel supply will be maintained at a value to prevent overspeeding.

The oil flowing past valve element 61 and part of the engine lubricating oil flow centrally through the apparatus via holes in the bosses 56 and this oil carries with it any air which is separated from the oil in the apparatus by centrifugal action.

In the construction illustrated the tail shaft 12 and the stationary structure 13 are accommodated centrally within the exhaust bullet structure 94 of the exhaust assembly of the turbine and the oil lines 17, 20 extend across the working of the fluid passage of the exhaust assembly within the usual struts 95 by which the bullet is supported from the external wall of the exhaust assembly. However, since the unit formed by the speed-responsive device and the valve it operates are bathed in lubricating oil, the temperature which it reaches in operation of the engine is limited.

Whilst in the arrangement above described lubricating oil has been employed in the governor system, it will be clear that the oil supply may be derived from other engine auxiliaries such as an hydraulic torquemeter. Also if desired, a continuous bleed flow may be provided in the pipe 20 for instance by providing a controlled leak from the bore of plug 88 to within the sleeve 80; this leak may be arranged to occur between the transfer tube 92 and the extension 71a of the boss 71.

Means may also be provided to hold the half-ball valve 42 in the closed position, for example for starting purposes. This means may be in the form of a cam interconnected with the throttle control lever of the engine, the cam acting directly on the part supporting the half-ball valve 42, which may in this case be in the form of a lever.

We claim:

1. A rotational-speed-sensitive device comprising a pair of flexible diaphragms clamped at their peripheries in a mounting by which they may be secured in the rotating part to the speed of which the device is to be sensitive, the diaphragms having their centres on the axis of rotation, being spaced axially apart and having their planes parallel to one another and inclined to the axis of rotation, a mass disposed between the diaphragms, offset from the axis of rotation and connected to transmit centrifugal loads to the centres of the diaphragms, and means joining the centres rigidly together, whereby on rotation of the device the centres of the diaphragms are displaced axially owing to the centrifugal effect on the mass, and resilient means to oppose the axial displacement of the diaphragm centres.

2. A rotational-speed-sensitive device according to claim 1, wherein the mass is connected to the diaphragm centres by a pair of integral rigid diverging arms so that the means rigidly connecting the diaphragm centres is afforded by the mass and its arms.

3. A rotational-speed-sensitive device according to claim 1, wherein the resilient means is in the form of a coil compression spring arranged coaxial with the axis of rotation.

4. A rotational-speed-sensitive device according to claim 1, wherein the planes of the diaphragms are inclined to the axis of rotation at an angle of about 70°.

5. A rotational-speed-sensitive device according to claim 1, comprising a tubular housing, wherein the diaphragms are clamped peripherally, hollow bosses secured to the centres of the diaphragms, said mass being connected to the bosses, and means connected to deliver a liquid to the housing at one end and means connected to convey the liquid away from the housing at the opposite end, the liquid having in operation a damping effect on the movement of the diaphragms and flowing from said one end of the housing to said opposite end in part through said hollow bosses.

6. A rotational-speed-sensitive device according to claim 5, wherein the resilient means is a coil spring coaxial with the rotational axis and at one end abuts one of the bosses, and there is provided an abutment for the opposite end of the spring comprising a spider-like portion at one end of the tubular housing, the spider-like portion permitting the passage of the liquid.

7. A rotational-speed-sensitive device according to claim 5, comprising a casing enclosing the tubular housing, said spider-like portion forming an end of said casing, there being an annular space between the tubular housing and the casing, the annular space being in communication with the interior of the tubular housing at both sides of each diaphragm.

8. A rotational-speed-sensitive device as claimed in claim 7, comprising a valve accommodated within said casing, said valve comprising a valve body coaxial with the axis of rotation and a valve element, and a spring acting on the valve element to urge it away from an orifice in the body, and there being a projection on one of the diaphragms against which the valve element is urged by the loading spring, whereby on change of rotational speed the valve element is moved towards or away from the orifice.

9. A rotational-speed-sensitive device as claimed in claim 8, comprising a pair of plates mounted in the casing, each plate having a hollow boss, the valve body being held between the plates and projecting in the hollow bosses, one of said bosses forming a cage around the valve element and the second boss forming a liquid flow duct leading to the valve body.

10. A rotational-speed-sensitive device as claimed in claim 9, comprising stationary structure and a cylindrical-surfaced transfer tube extending from the stationary structure to the second boss, the transfer tube being rotatable relative to both the second boss and the stationary structure.

11. A rotational-speed-sensitive device as claimed in claim 5, comprising stationary structure having a wall defining a liquid flow chamber therein and means to convey liquid between the tubular housing and the stationary structure, said housing being provided with a hollow cylindrical boss coaxial with the axis of rotation, said means comprising a tubular transfer member coaxial with the axis of rotation, said tubular transfer member having a cylindrical surface engaging said hollow cylindrical boss on the housing and having a flange urged into axial abutment with said wall of the liquid flow chamber forming part of the stationary structure.

References Cited in the file of this patent

UNITED STATES PATENTS 2,467,445    Schwendner  ------------ Apr. 19, 1949